(12) United States Patent
Uno

(10) Patent No.: US 9,063,279 B2
(45) Date of Patent: Jun. 23, 2015

(54) LENS BARREL

(71) Applicant: Panasonic Corporation, Osaka (JP)

(72) Inventor: Tetsuya Uno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/162,134

(22) Filed: Jan. 23, 2014

(65) Prior Publication Data

US 2014/0204471 A1 Jul. 24, 2014

(30) Foreign Application Priority Data

Jan. 24, 2013 (JP) ................. 2013-011006

(51) Int. Cl.
*G02B 7/02* (2006.01)
*G02B 7/10* (2006.01)
*G02B 7/04* (2006.01)

(52) U.S. Cl.
CPC .. *G02B 7/10* (2013.01); *G02B 7/04* (2013.01); *G02B 7/023* (2013.01)

(58) Field of Classification Search
CPC ............. G02B 7/023; G02B 7/04; G02B 7/10
USPC .......................................... 359/822, 823, 826
See application file for complete search history.

(56) References Cited

U.S. PATENT DOCUMENTS

| | | | |
|---|---|---|---|
| 5,805,938 | A | 9/1998 | Kamata |
| 6,035,136 | A | 3/2000 | Hayashi et al. |
| 2011/0038059 | A1 | 2/2011 | Oya |

FOREIGN PATENT DOCUMENTS

| | | | |
|---|---|---|---|
| JP | 10-197773 | A | 7/1998 |
| JP | 11-174305 | A | 7/1999 |
| JP | 2001-235673 | A | 8/2001 |
| JP | 2003-066308 | A | 3/2003 |
| JP | 2009-042345 | A | 2/2009 |
| JP | 2010-156870 | A | 7/2010 |
| JP | 2011-039386 | A | 2/2011 |

*Primary Examiner* — William Choi
(74) *Attorney, Agent, or Firm* — Renner, Otto, Boisselle & Sklar, LLP

(57) ABSTRACT

A lens barrel has a rotary frame, lens group frame, and shutter frame. The rotary frame has first and second cam grooves respectively on inner and outer peripheries as viewed in a radial direction. A first cam follower of the lens group frame and a second cam follower of the shutter frame are respectively engaged with the first and second grooves. A radial direction size the rotary frame is smaller than a sum of depths of the first and second grooves. The rotary frame includes a first region W1 only with the first groove, a region W0 with first and second grooves, and a region W2 only with the second groove. Positions of the first and second followers differ in a circumferential direction. At least one of the first and second followers has a non-contact portion not contacting with a groove wall of the corresponding groove in the region W0.

12 Claims, 13 Drawing Sheets

LENS BARREL

CROSS-REFERENCE TO RELATED APPLICATIONS

This application claims priority of Japanese Patent Application No.: 2013-011006 filed on Jan. 24, 2013, the content of which is incorporated herein by reference.

BACKGROUND

1. Technical Field

The present invention relates to a lens barrel.

2. Description of Related Art

JP 2003-66308 A and JP 2010-156870 A disclose a lens barrel provided with a cam cylinder portion having cam grooves on an inner peripheral portion and an outer peripheral portion thereof.

SUMMARY

It is an object of the present disclosure to provide a lens barrel where a thickness of a cam cylinder frame having cam grooves on an inner periphery and an outer periphery thereof can be decreased while surely preventing or suppressing the disengagement of a cam follower from the cam groove by a cause such as falling of the lens barrel.

A lens barrel according to the present disclosure comprises, a cam cylinder frame having a first cam groove formed on an inner periphery thereof and a second cam groove formed on an outer periphery thereof in a state where the second cam groove intersects with the first cam groove as viewed in a radial direction, a first movable frame arranged on an inner peripheral side of the cam cylinder frame and having a first cam follower which is engaged with the first cam groove, and a second movable frame arranged on an outer peripheral side of the cam cylinder frame and having a second cam follower which is engaged with the second cam groove. A size in the radial direction of the cam cylinder frame is set smaller than a sum of a depth of the first cam groove and a depth of the second cam groove so that the cam cylinder frame includes a first region where only the first cam groove is formed, an overlapping region where the first cam groove and the second cam groove are formed, and a second region where only the second cam groove is formed, the regions being arranged in this sequence in a thickness direction from the inner peripheral side. A position of the first cam follower and a position of the second cam follower are different from each other in a circumferential direction. At least one of the first cam follower and the second cam follower has a non-contact portion which is not brought into contact with a groove wall of the corresponding cam groove in the overlapping region.

DETAILED DESCRIPTION

Hereinafter, an embodiment is explained in detail in conjunction with drawings. However, the excessively detailed explanation of the embodiment may be omitted. For example, the detailed explanation of matters which are already well-known or the repeated explanation of the substantially identical constitutions may be omitted. Such omission can prevent the explanation made hereinafter from becoming unduly redundant thus facilitating the understanding of this disclosure by those who are skilled in the art.

The applicant provides attached drawings and the explanation made hereinafter for enabling those who are skilled in the art to sufficiently understand this disclosure, and the applicant does not intend to limit the invention called for in Claims.

In the following embodiment, the explanation is made by taking a lens barrel mounted on a digital still camera as an example. However, this disclosure is not limited to the digital camera and is also applicable to various lens barrels including film cameras, video cameras, portable cameras, in-vehicle cameras, and projectors.

[1. Schematic Constitution of Lens Barrel 900]

Figure 1:
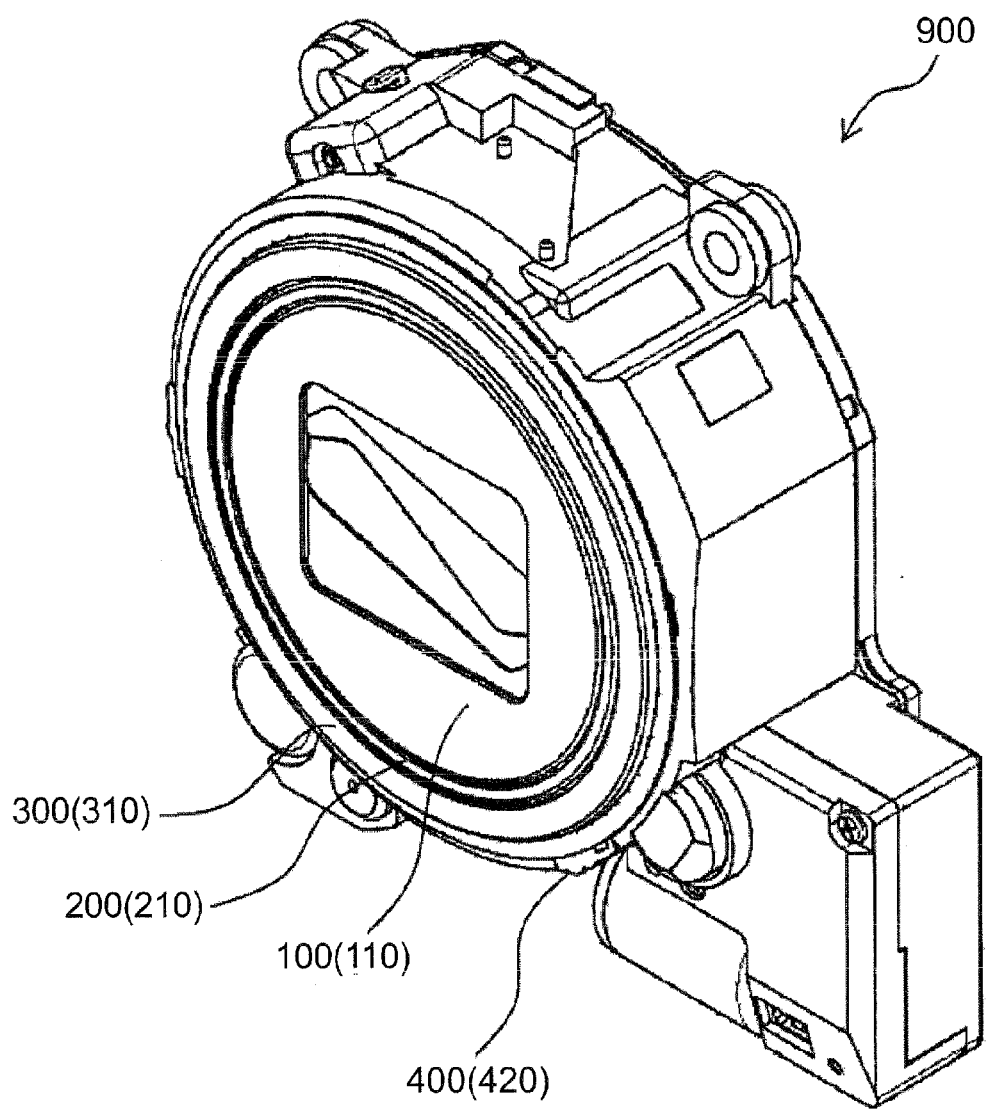
FIG. 1 is a perspective view of a lens barrel.
Figure 2:
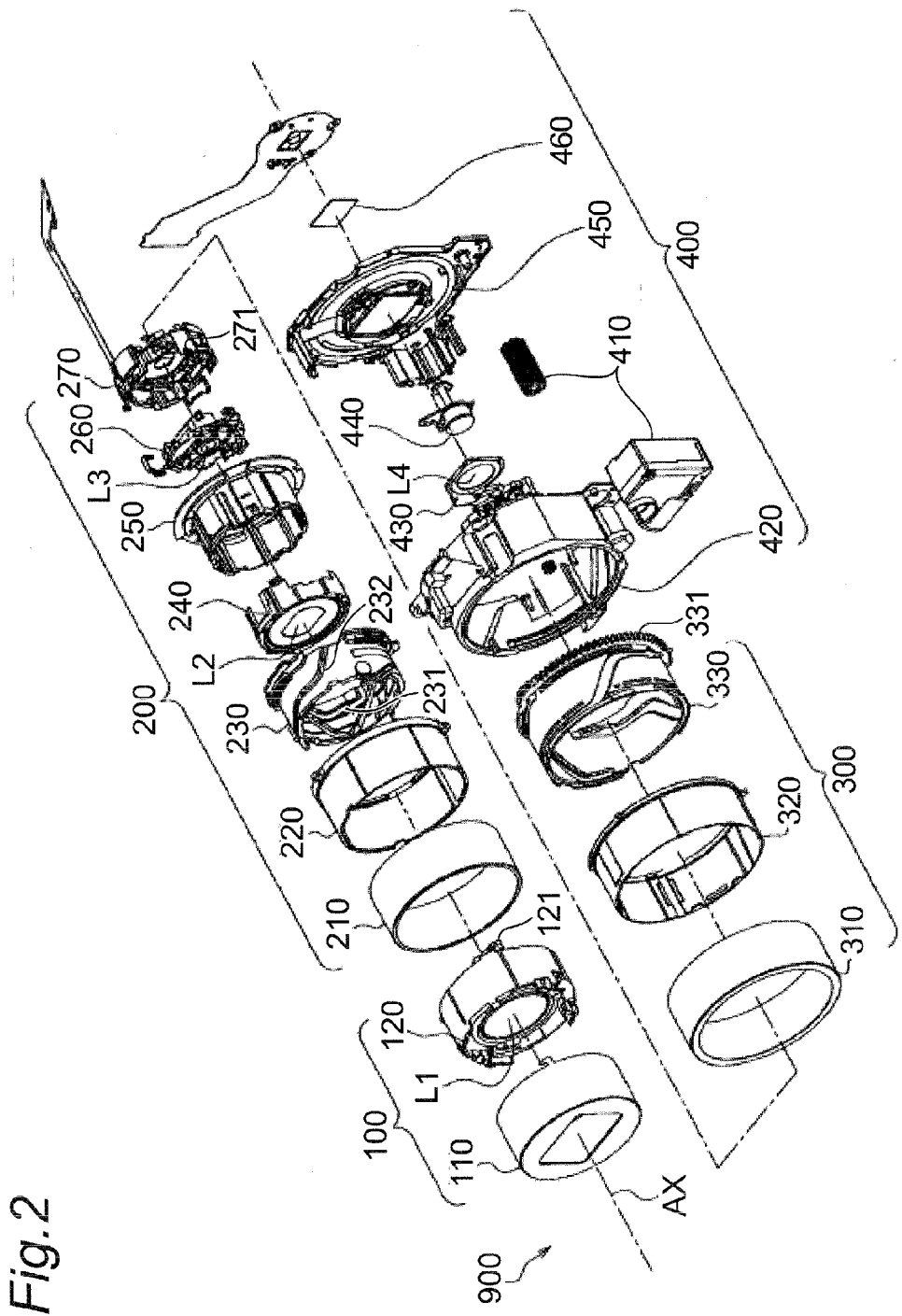
FIG. 2 is an exploded perspective view of the lens barrel.

With reference to FIGS. 1 and 2, a lens barrel 900 includes a first lens unit 100, a second lens unit 200, a third lens unit 300, and an imaging unit 400. A reference symbol AX indicates an optical axis of the lens barrel 900.

In the explanation made hereinafter, the direction parallel to the optical axis AX is referred to as an optical axis direction, and the direction perpendicular to the optical axis AX is referred to as a radial direction. The direction along a circle about the optical axis AX is referred to as a circumferential direction. Further, a side where an object to be imaged is arranged in the optical axis direction is referred to as a front side or a front surface side, whereas a side where the object to be imaged is not arranged in the optical axis direction (a side where an imaging element part 460 described later is arranged) is referred to as a rear side or a back surface side. A term "cam mechanism" means the structure where one element of two relevant elements includes a cam and the other element includes a cam follower. A term "rotation restricting mechanism" means the structure where two relevant elements are connected to each other in a state where the elements are movable rectilinearly relative to each other in the optical axis direction but are not rotatable in the circumferential direction relative to each other. A term "rectilinear motion restricting mechanism" means the structure where two relevant elements are connected to each other in a state where the elements are rotatable in the circumference direction relative to each other but are not movable relative to each other in the optical axis direction.

The first lens unit 100 includes a first decoration frame 110, and a first lens group frame 120 having a first lens group L1.

The second lens unit 200 includes a second decoration frame 210, a first rectilinear frame 220, a first rotary frame (cam cylinder frame) 230, a second lens group frame (second movable frame) 240 having a second lens group L2, a second rectilinear frame 250, a third lens group frame 260 having a third lens group L3, and a shutter frame (first movable frame) 270.

The third lens unit 300 includes a third decoration frame 310, a third rectilinear frame 320, and a second rotary frame 330.

The imaging unit 400 includes a fixing frame 420 on which a zoom motor unit 410 is mounted, a fourth lens group frame 430 having a fourth lens group L4, a master flange 450 on which a focus motor unit 440 is mounted, and an imaging element part 460.

The third rectilinear frame 320 is arranged inside the fixing frame 420 in the radial direction. The second rotary frame 330 is arranged inside the third rectilinear frame 320 in the radial direction.

A gear portion 331 of the second rotary frame 330 is meshed with the zoom motor unit 410. The second rotary frame 330 is engaged with the fixing frame 420 by a cam mechanism. Accordingly, the second rotary frame 330 is movable in the optical axis direction while rotating in the circumferential direction due to a drive force of the zoom motor unit 410.

The third rectilinear frame 320 is engaged with the fixing frame 420 by a rotation restricting mechanism. The third rectilinear frame 320 is engaged with the second rotary frame 330 by a rectilinear movement restricting mechanism. Accordingly, the third rectilinear frame 320 is movable in the optical axis direction together with the second rotary frame 330 but is not rotatable in the circumferential direction.

The first rectilinear frame 220 is arranged inside the second rotary frame 330 in the radial direction. The first rectilinear frame 220 is engaged with the second rotary frame 330 by a cam mechanism, and is engaged with the third rectilinear frame 320 by a rotation restricting mechanism. Accordingly, the first rectilinear frame 220 is movable in the optical axis direction in response to the rotation of the second rotary frame 330 but is not rotatable in the circumferential direction.

The first rotary frame 230 is arranged inside the first rectilinear frame 220 in the radial direction. The first rotary frame 230 is engaged with the second rotary frame 330 by a rotation restricting mechanism. Further, the first rotary frame 230 is engaged with the first rectilinear frame 220 by a rectilinear movement restricting mechanism. Accordingly, the first rotary frame 230 is movable in the optical axis direction together with the first rectilinear frame 220 while rotating in the circumferential direction together with the second rotary frame 330.

The second rectilinear frame 250 is arranged inside the first rotary frame 230 in the radial direction. The second rectilinear frame 250 is engaged with the first rectilinear frame 220 by a rotation restricting mechanism. Further, the second rectilinear frame 250 is engaged with the first rotary frame 230 by a rectilinear movement restricting mechanism. Accordingly, the second rectilinear frame 250 is movable in the optical axis direction together with the first rotary frame 230 but is not rotatable in the circumferential direction.

The first lens group frame 120 is arranged outside the first rotary frame 230 in the radial direction and inside the first rectilinear frame 220 in the radial direction. The first lens group frame 120 is engaged with the first rectilinear frame 220 by a rotation restricting mechanism. Further, the first lens group frame 120 is engaged with the first rotary frame 230 by a cam mechanism. As described in detail later, the cam mechanism includes a second cam follower 121 of the first lens group frame 120 and a second cam groove 232 of the first rotary frame 230. The first lens group frame 120 is movable in the optical axis direction in response to the rotation of the first rotary frame 230 but is not rotatable in the circumferential direction. The first lens group frame 120 is arranged on a side where an object to be imaged is arranged with respect to the shutter frame 270.

The second lens group frame 240 is arranged inside the first rotary frame 230 in the radial direction (inside the second rectilinear frame 250 in the radial direction). The second lens group frame 240 is engaged with the second rectilinear frame 250 by a rotation restricting mechanism. Further, the second lens group frame 240 is engaged with the first rotary frame 230 by a cam mechanism. Accordingly, the second lens group frame 240 is movable in the optical axis direction in response to the rotation of the first rotary frame 230 but is not rotatable in the circumferential direction.

The shutter frame 270 is arranged inside the first rotary frame 230 in the radial direction (inside the second rectilinear frame 250 in the radial direction). The shutter frame 270 is engaged with the second rectilinear frame 250 by a rotation restricting mechanism. Further, the shutter frame 270 is engaged with the first rotary frame 230 by a cam mechanism. As described in detail later, the cam mechanism includes first cam followers 271 of the shutter frame 270, and first cam grooves 231 of the first rotary frame 230. The shutter frame 270 is movable in the optical axis direction in response to the rotation of the first rotary frame 230 but is not rotatable in the circumferential direction. The shutter frame 270 is arranged relatively behind the first lens group frame 120 or on a side opposite to an object to be imaged with respect to the first lens group frame 120.

The third lens group frame 260 is mounted on the shutter frame 270. When the shutter frame 270 moves rectilinearly in the optical axis direction with respect to the second rectilinear frame 250, a retractable lens frame of the third lens group frame 260 is rotated by a retracting mechanism not shown in the drawing. Due to such an operation, when the lens barrel 900 is shifted to a photographable state from a collapsed state, the retractable lens frame moves from a retracted position to a correction possible position. On the other hand, when the lens barrel 900 is shifted to the collapsed state from the photographable state, the retractable lens frame moves from the correction possible position to the retracted position. When the retractable lens frame is arranged at the correction possible position, the third lens group L3 is movable within a plane perpendicular to the optical axis AX. That is, it is possible to perform image blurring correction in such a state.

Figure 3:
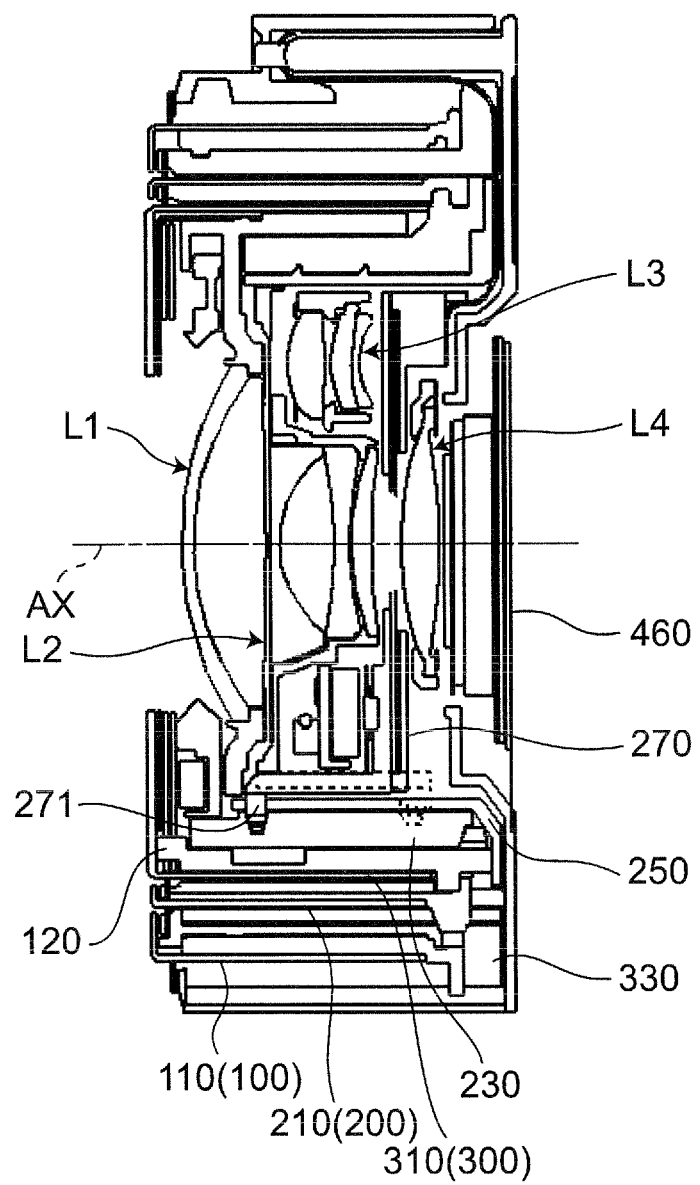
FIG. 3 is a schematic sectional view of the lens barrel in a collapsed state.
Figure 4:
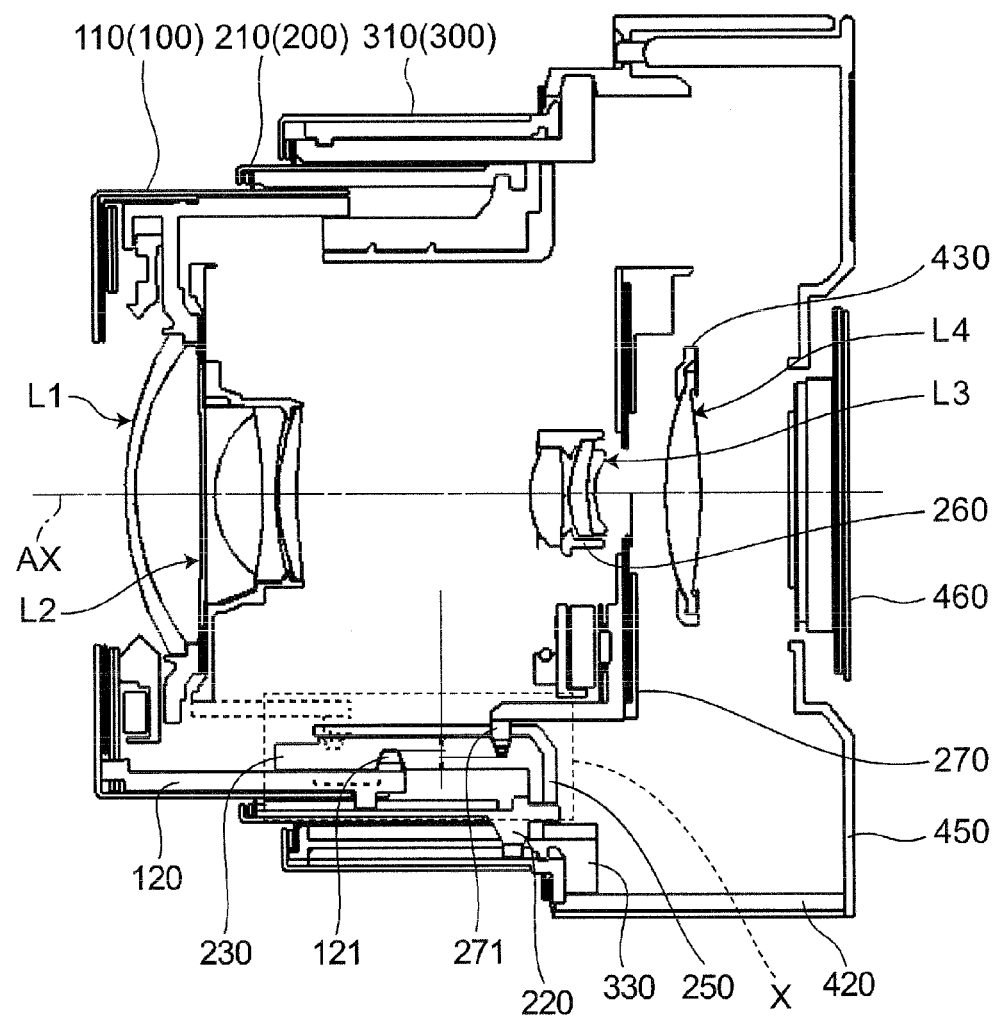
FIG. 4 is a schematic cross-sectional view of the lens barrel in a wide angle state.
Figure 5:
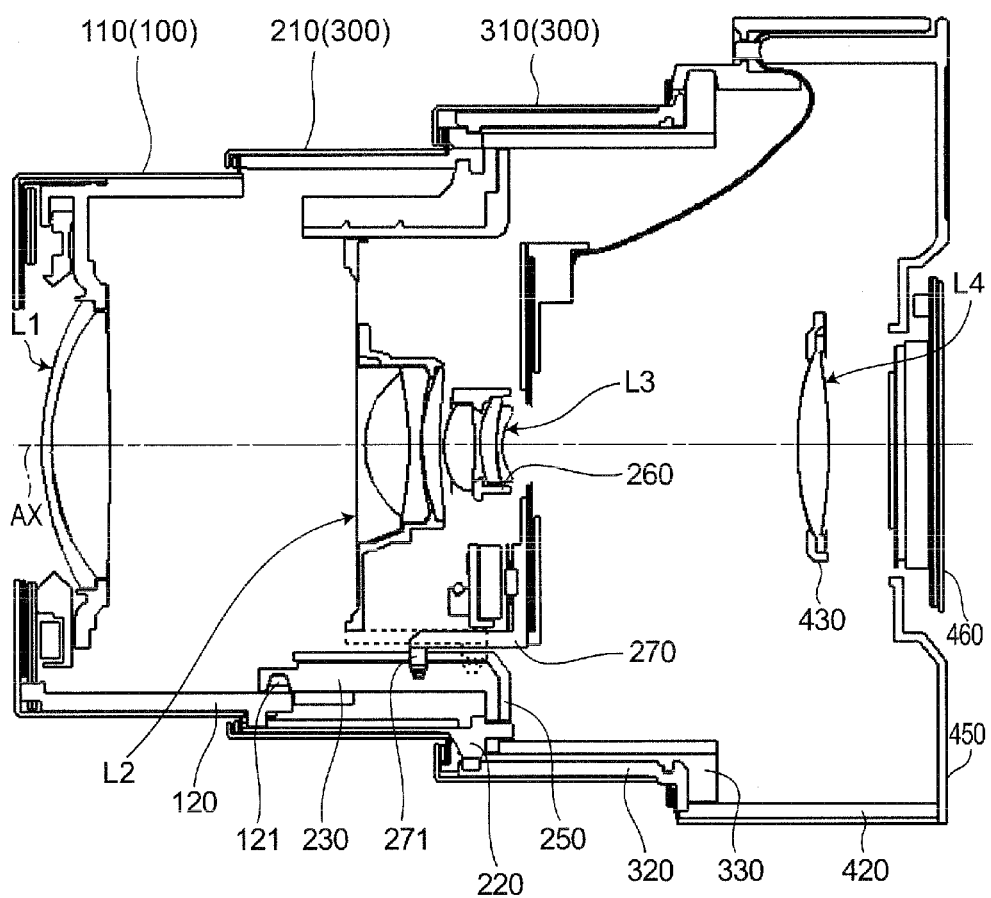
FIG. 5 is a schematic cross-sectional view of the lens barrel in a collapsed state.

Due to the rotation of the second rotary frame 330 and the rotation of the first rotary frame 230 by a drive force of the zoom motor unit 410, the movement of the rectilinear frames 220, 320, and 250 and the lens group frames 120, 240, and 260 can be realized. As shown in FIGS. 3 to 5, the first lens unit 100, the second lens unit 200, and the third lens unit 300 are extended in the optical axis direction in three stages from the fixing frame 420. FIG. 3 shows a collapsed state (accommodated state) of the lens barrel 900. Due to the engagement among these constitutional parts, a state of a lens barrel 900 is changed to a wide angle state shown in FIG. 4 from a state shown in FIG. 3. Further, the state of the lens barrel 900 is changed to a telescopic state shown in FIG. 5 from a state shown in FIG. 4 due to the engagement relationship among the constitutional parts.

[2. The constitution of the first rotary frame 230, the shutter frame 270, and the first lens group]

With reference to FIGS. 3 to 6 (particularly, FIG. 6), FIG. 8, and FIG. 9, cam grooves are formed on both an inner peripheral surface and an outer peripheral surface of the first rotary frame 230 (double-sided cam cylinder frame) respectively. To be more specific, first cam grooves 231 are formed on an inner peripheral surface 230a of the first rotary frame 230, and second cam grooves 232 are formed on an outer peripheral surface 230b of the first rotary frame 230.

Figure 6:
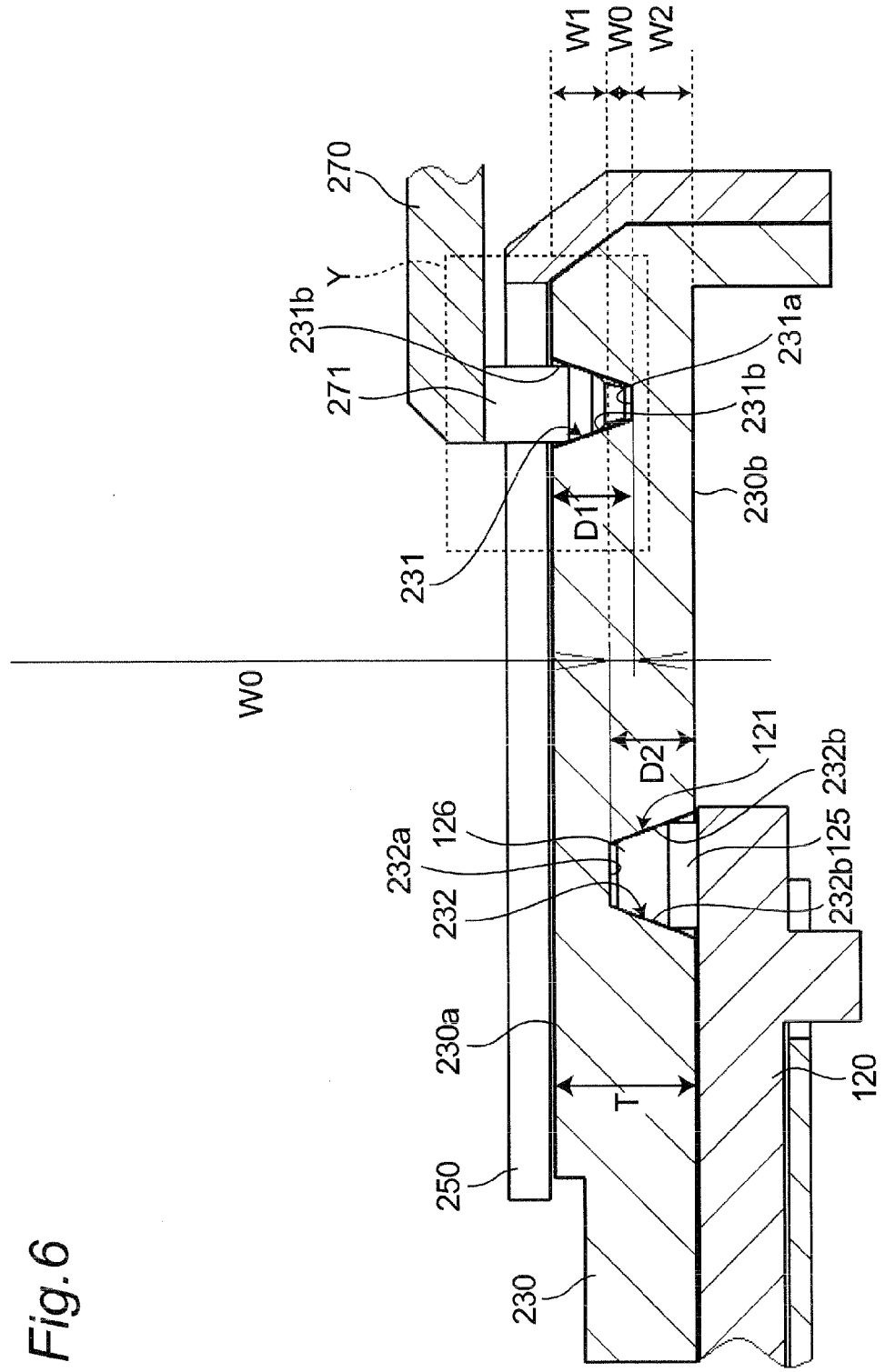
FIG. 6 is an enlarged view of an area X of FIG. 4.
Figure 7:
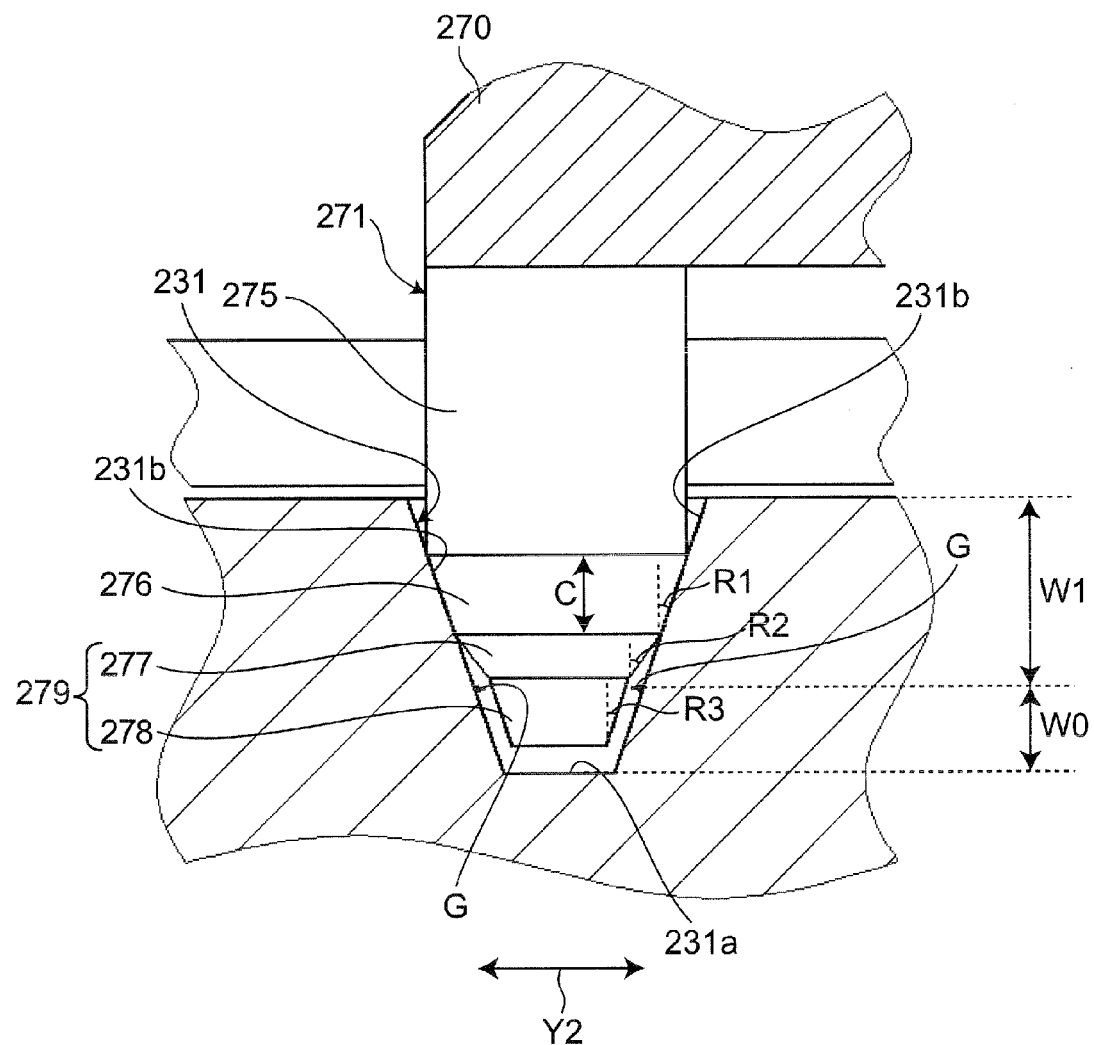
FIG. 7 is an enlarged view of an area Y of FIG. 6.

With reference to FIGS. 6 and 7, the first cam groove 231 is defined by a bottom wall 231a, and a pair of side walls 231b which extends toward an inner peripheral surface 230a of the first rotary frame 230 from the bottom wall 231a and faces each other in an opposed manner. In the same manner as the first cam groove 231, the second cam groove 232 is defined by a bottom wall 232a, and a pair of side walls 232b which extends toward an outer peripheral surface 230b of the first rotary frame 230 from the bottom wall 232a and faces each other in an opposed manner. As described in detail later, the first rotary frame 230 is formed by injection molding. The side walls 231b and the side walls 232b are inclined with respect to the radial direction in order to avoid an undercut formed at the time of operating molds in injection molding.

Figure 8:
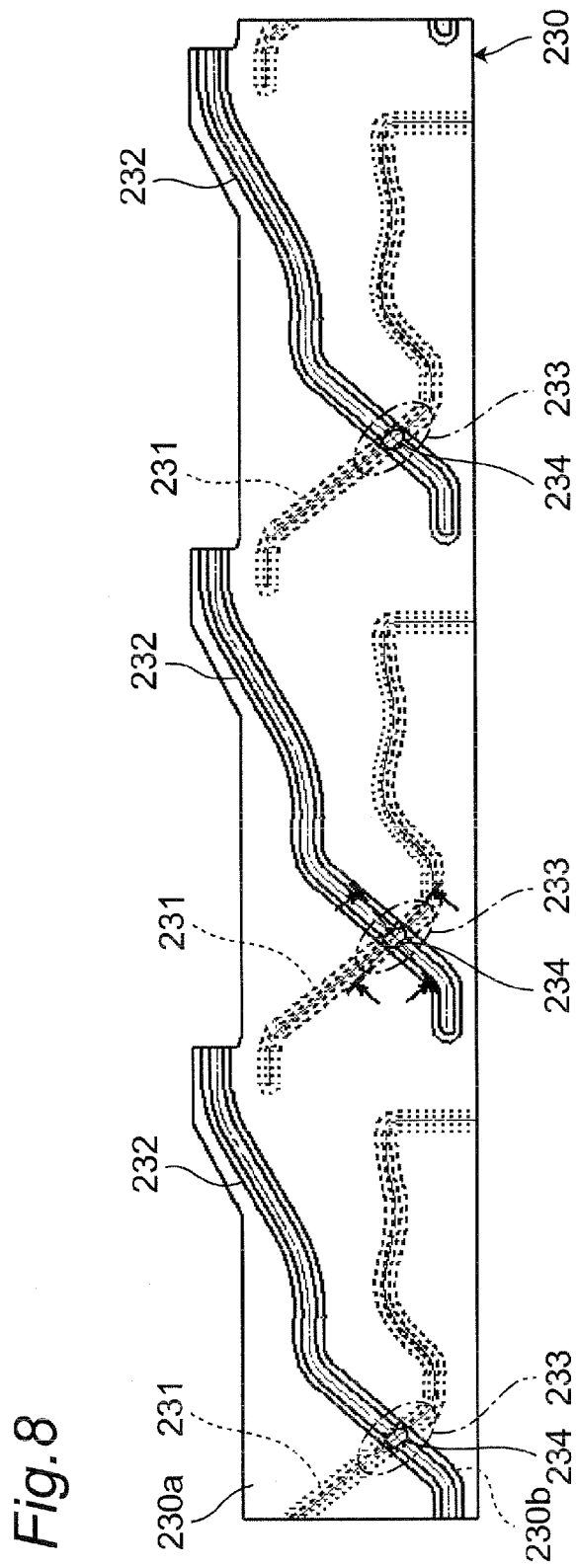
FIG. 8 is a development view of an outer peripheral portion of a first rotary frame.

As shown in FIG. 8, three first cam grooves 231 are formed on the inner peripheral surface 230a of the first rotary frame 230 in a state where the cam grooves 231 are arranged equidistantly in the circumferential direction. Further, three second cam grooves 232 are formed on the outer peripheral surface 230b of the first rotary frame 230 in a state where the cam grooves 232 are arranged equidistantly in the circumferential direction. As viewed in the radial direction, each of the first cam grooves 231 intersects with one of second cam groove 232.

With reference to FIGS. 3 to 7 (particularly, FIGS. 6 and 7), as described previously, the shutter frame 270 is arranged inside the first rotary frame 230. The first cam followers 271 are mounted on an outer periphery of the shutter frame 270. The first cam followers 271 are engaged with the first cam grooves 231. Further, the shutter frame 270 is engaged with the second rectilinear frame 25 by the rotation restricting mechanism. Accordingly, when the first rotary frame 230 is rotated, the first cam followers 271 move in the inside of the first cam grooves 231 along with the rotation of the first rotary frame 230 so that the shutter frame 270 moves in the optical axis AX direction relative to the first rotary frame 230.

With reference to FIGS. 3 to 6 (particularly, FIG. 6), as described previously, the first lens group frame 120 is arranged outside the first rotary frame 230. The second cam followers 121 are mounted on the inner periphery of the first lens group frame 120. The second cam followers 121 are engaged with the second cam grooves 232. Further, the first lens group frame 120 is engaged with the first rectilinear frame 220 by the rotation restricting mechanism. Accordingly, when the first rotary frame 230 is rotated, the second cam followers 121 move in the inside of the second cam grooves 232 along with the rotation of the first rotary frame 230 so that the first lens group frame 120 moves in the optical axis AX direction relative to the first rotary frame 230.

With reference to FIG. 6, a thickness T of the first rotary frame 230 in the radial direction is shorter than a sum of a depth D1 of the first cam groove 231 and a depth D2 of the second cam groove 232. That is, the thickness T of the first rotary frame 230 and the depths D1, D2 of the first and second cam grooves 231 and 232 satisfy the following relationship expressed by a formula (1).

[Formula 1]

$$T < D1 + D2 \quad (1)$$

By setting the relationship between the thickness T of the first rotary frame 230 and the depths D1 and D2 of the first and second cam grooves 231 and 232 so that they satisfy the formula (1), the first cam groove 231 and the second cam groove 232 overlap with each other in the radial direction of the first rotary frame 230. That is, the first rotary frame 230 is provided with, in the radial direction toward the outer peripheral surface 230b from the inner peripheral surface 230a: a first region W1 where only the first cam grooves 231 are formed on the first rotary frame 230; an overlapping region W0 where both the first cam grooves 231 and the second cam grooves 232 are formed on the first rotary frame 230, and a second region W2 where only the second cam grooves 232 are formed on the first rotary frame 230.

As shown in FIG. 6, the first cam follower 271 and the second cam follower 121 are also overlap with each other in the radial direction. In other words, in the overlap region W0, both of the first cam follower 271 and the second cam follower 121 are formed.

As can be clearly understood from the geometrical relationship shown in FIG. 6, with respect to sizes in the radial direction of the first region W1, the overlapping region W0, and the second region W2 and the depths D1 and D2 of the first and second cam grooves 231 and 232, the relationship expressed by the following formula (2) is established.

[Formula 2]

$$D1 = W1 + W0$$

$$D2 = W2 + W0 \quad (2)$$

By setting the thickness T of the first rotary frame 230 and the depths D1 and D2 of the first and second cam grooves 231 and 232 so that they satisfy the relationship expressed by the formula (1), and by providing the overlapping region W0 which satisfies the relationship expressed by the formula (2), the thickness T of the first rotary frame 230 can be decreased while preventing or suppressing the disengagement of the first and second cam followers 271 and 121 from the first and second cam grooves 231 and 232 (strength against falling) by a cause such as falling of the lens barrel 900 or the like whereby the diameter of the whole lens barrel 900 can be decreased. To be more specific, under the condition where the thickness T of the first rotary frame 230 is equal, by providing the overlapping region W0, the depths D1 and D2 of the first and second cam grooves 231 and 232 can be set larger compared to a case where the overlapping region W0 is not provided. On the other hand, under the condition where the depths D1 and D2 of the first and second cam grooves 231 and 232 are equal, by providing the overlapping region W0, the thickness T in the radial direction of the first rotary frame 230 can be set smaller compared to a case where the overlapping region W0 is not provided. In other words, by providing the overlapping region W0, it is possible to achieve both requirements conflicting with each other, that is, the requirement that the depths D1 and D2 of the first and second cam grooves 231 and 232 are to be increased and the requirement that the thickness T of the first rotary frame 230 is to be decreased.

Figure 9:
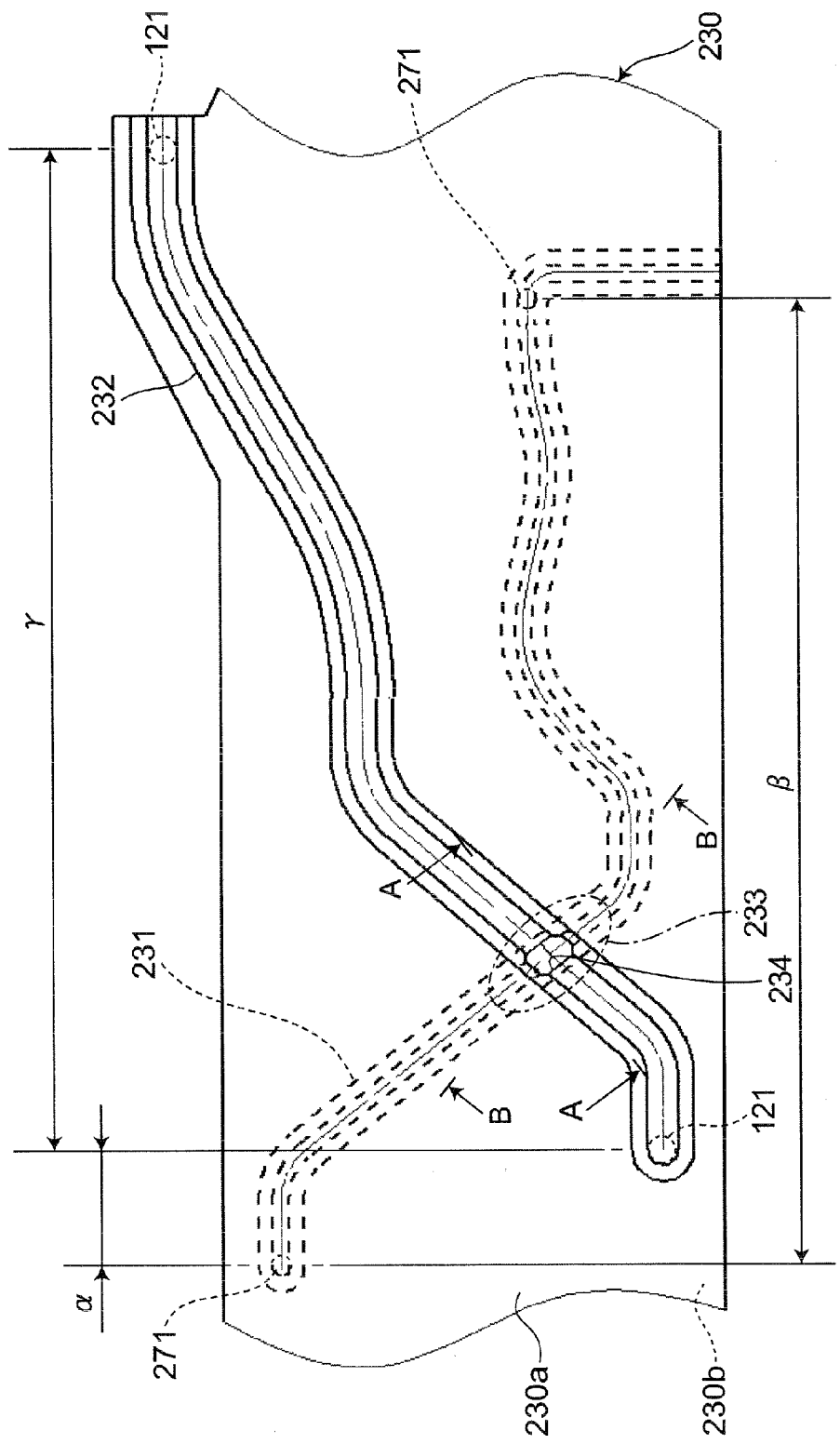
FIG. 9 is a partial enlarged view of FIG. 8.
Figure 10:
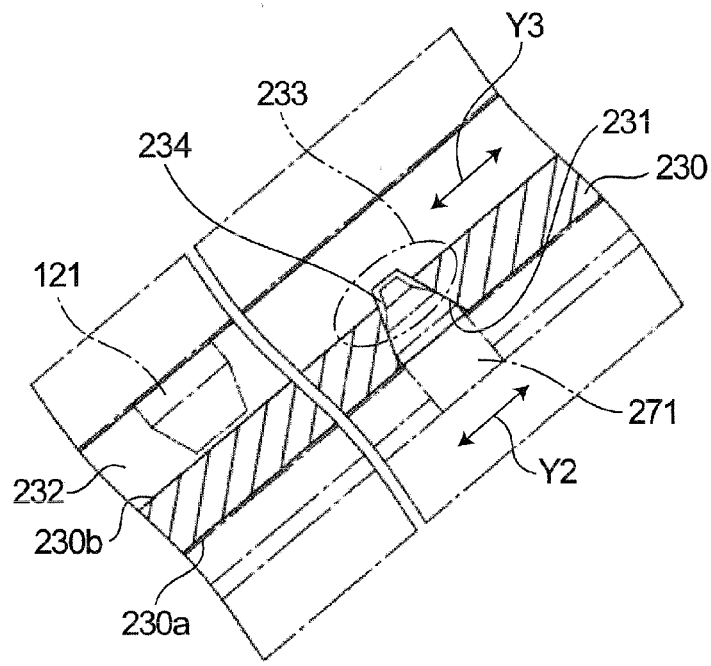
FIG. 10 is a cross-sectional view taken along a line A-A in FIG. 9.
Figure 11:
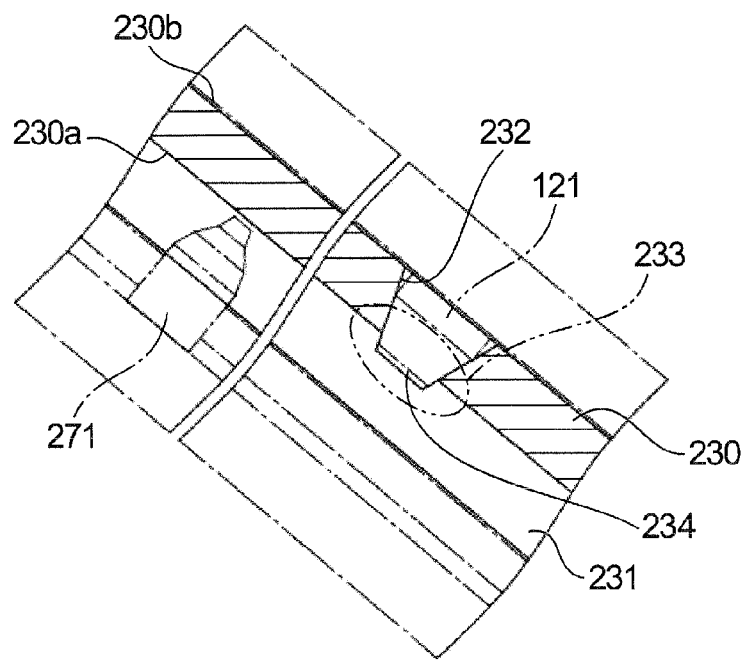
FIG. 11 is a cross-sectional view taken along a line B-B in FIG. 9.

As shown in FIGS. 8 and 9, the first cam groove 231 and the second cam groove 232 intersect with each other as viewed in the radial direction. An intersecting portion of the first cam groove 231 and the second cam groove 232 is indicated by reference numeral 233. On the other hand, as described previously, the first rotary frame 230 is provided with the overlapping region W0 in the thickness direction where both the first cam groove 231 and the second cam groove 232 are formed. Accordingly, as shown in FIGS. 10 and 11, the first cam groove 231 and the second cam groove 232 are communicated with each other at the intersecting portion 233. In other words, in the intersecting portion 233, a through hole 234 is formed so as to penetrate the first rotary frame 230 from the inner peripheral surface 230a to the outer peripheral surface 230b of the first rotary frame 230.

As can be clearly understood from FIGS. 9 to 11, assuming that the cam followers 271 and 121 which respectively move along the first and second cam grooves 231 and 232 simultaneously reach the intersecting portion 233 (where the through hole 234 is formed as described previously) at the same timing, the first cam follower 271 and the second cam follower 121 interfere or collide with each other because the first and second cam followers 271 and 121 exist in the overlapping region W0 as shown in FIG. 6. To avoid such a collision, as shown in FIG. 9, the displacement a is provided between a phase of movement of the first cam follower 271 in the first cam groove 231 and a phase of movement of the second cam follower 121 in the second cam groove 232. In other words, displacement a is provided between an angular range of movement of the first cam follower 271 in the first cam groove 231 and an angular range of movement of the second cam follower 121 in the second cam groove 232. The term "angular" referred to here is angles formed by lines drawn from positions on the cam grooves in the first rotary frame 230 to the optical axis AX. Further, the positions of the first cam follower 271 and the positions of the second cam follower 121 are different from each other in a circumferential direction, i.e. in a direction along a circle with a center coincident with the optical axis AX. This can also be expressed that the displacement a in the circumferential direction is provided between the positions of the first cam follower 271 and the positions of the second cam follower 121. In FIG. 9, reference symbol β indicates a movable angular range of the first cam follower 271 in the first cam groove 231, and reference symbol γ indicates a movable angular range of the second cam follower 121 in the second cam groove 232. By providing the displacement a in phase, when either one of the first and second cam followers 271 and 121 reaches the intersecting portion 233, the other of the first and second cam followers 271 and 121 is located at a position other than the intersecting portion 233. Accordingly, there is no possibility that the first cam follower 271 and the second cam follower 121 collide with each other in the intersecting portion 233. In case that the displacement a is regarded as a distance between a center of the first cam follower 271 and a center of the second cam follower 121, the displacement a is required to be equal to or more than a sum of a radius of the first cam follower 271 and a radius of the second cam follower 121 in the overlapping region W0.

With reference to FIG. 6, in this embodiment, the depth D2 of the second cam groove 232 is set larger than the depth D1 of the first cam groove 231. That is, the depths D1 and D2 have the relationship expressed by a following formula (3).

[Formula 3]

$$D2 > D1 \quad (3)$$

The following formula (4) is obtained by substituting the formula (2) into the formula (3). That is, the second region W2 has the larger length in the radial direction than the first region W1. The relationship expressed by the formula (4) is also apparent from the formula (3) and the geometrical relationship shown in FIG. 6.

[Formula (4)]

$$W2 > W1 \quad (4)$$

By setting the depth D2 of the second cam groove 232 larger than the depth D1 of the first cam groove 231 as expressed by the formula (3), it is possible to maintain the strength of the lens barrel 900 against falling. As can be clearly understood from FIGS. 4 and 5, when the lens barrel 900 is in a non-collapsed state, the first lens group frame 120 is arranged on a frontmost side or a side closest to an object to be imaged. Accordingly, when a digital still camera including the lens barrel 900 falls with the first lens group L1 directed downward or the like, the digital still camera falls in a state that the first lens group frame 120 comes into contact with the ground. In this case, a total weight of the digital still camera is applied to the first lens group frame 120. Further, a weight of the first lens group frame 120 including the first lens group L1 is larger than a weight of the shutter frame 270 having no lenses. Accordingly, when the digital still camera falls, a larger force acts on the first lens group frame 120 side compared to the shutter frame 270. Since the depth D2 of the second cam groove 232 is set larger than the depth D1 of the first cam groove 231 in this embodiment, it is possible to more effectively prevent or suppress the disengagement of the first lens group frame 120 from the first rotary frame 230 when the digital still camera falls.

A minimum value of the thickness T (minimum thickness) of the first rotary frame 230 in the radial direction necessary for preventing the disengagement of the first cam follower 271 and the second cam follower 121 when the lens barrel 900 is defined as Tmin. A minimum value of the depth D1 (minimum depth) of the first cam groove 231 necessary for preventing the disengagement of the first cam follower 271 when the lens barrel 900 is defined as D1min. A minimum value of the depth D2 (minimum depth) of the second cam groove 232 necessary for preventing the disengagement of the second cam follower 121 when the lens barrel 900 is defined as D2min. Further, a minimum value of the first region W1 is defined as W1 min. The first region W1 includes a contact width C (see FIG. 7) in the radial direction of a contact portion 276 of the first cam follower 271 described later. When the contact width C in the radial direction is minimum, the first region W1 takes the minimum value W1 min. The minimum value W1 min is not set to as a size necessary for preventing the disengagement of the first cam follower but set to as a minimum value, e.g. necessary for preventing destruction such as a dent of a portion of the contact width C when falling down or destruction such as abrasion during sliding. The minimum value W1 min depends on various factors, and a numerical value of the minimum value W1 min varies depending on the combination of such factors. These factors include an impact force applied to the lens barrel 900 when falling down, a falling down direction of the lens barrel 900, a total weight of the shutter frame 270, rigidities of the shutter frame 270 and the first rotary frame 230, dimension errors of the shutter frame 270 and the first rotary frame 230, necessary numbers of times of zooming and collapsing, a posture of the lens barrel 900 when activated, abrasionability of materials for the shutter frame 270 and the first rotary frame 230, a backlash of the first cam groove 231 or the first cam follower 271, inclination of the first cam groove 231 or the first cam follower 271, coefficient of friction for a contact portion between the first cam groove 231 and the first cam follower 271, surface roughness, friction and lubrication conditions including a type of lubricant.

The minimum depth D1min of the first cam groove 231 means a minimum value of an overlapping amount between the first cam groove 231 and the first cam follower 271 in the direction orthogonal to the optical axis necessary for preventing the disengagement of the first cam follower 271 from the first cam groove 231 which may be caused by the conversion of a force in the optical axis direction applied to the shutter frame 270 when the lens barrel 900 falls into a force which moves the first cam follower 271 in the inward disengaging direction orthogonal to the optical axis. The minimum depth D1 min at which the first cam follower 271 is not disengaged when the lens barrel 900 falls depends on various factors, and a numerical value of the minimum depth D1 min varies depending on the combination of such factors. These factors include the impact force applied to the lens barrel 900 when falling down, the falling down direction of the lens 900, the total weight of the shutter frame 270, the rigidities of the shutter frame 270 and the first rotary frame 230, the dimension errors of the shutter 270 and the first rotary frame 230 the backlash between the first cam groove 231 and the first cam follower 271, the inclination of the first cam groove 231 or the first cam follower 271, a friction state of the contact portion between the first cam groove 231 and the first cam follower 271 and the like. The reason a force in the optical axis direction applied to the shutter frame 270 is converted into a force which moves the first cam follower 271 in the inward disengaging direction orthogonal to the optical axis is that the side walls 231b of the first cam groove 231 have the inclination to avoid an undercut at the time of injection molding as described previously, and the first cam follower 271 also has the inclination correspondingly as described later. The above-discussion can be applied to the minimum depth D2min of the second cam groove 232. The minimum value D2min necessary for preventing the disengagement when falling down depends on various factors, and a numerical value of the minimum value D2min varies depending of the combination of such factors. These factors include the impact force applied to the lens barrel 900 when falling down, the falling down direction of the lens barrel 900, the total weight of the shutter frame 270, the rigidities of the shutter frame 270 and the first rotary frame 230, the dimension errors of the shutter frame 270 and the first rotary frame 230, the necessary numbers of times of zooming and collapsing, the posture of the lens barrel 900 when activated, the abrasionability of the materials for the shutter frame 270 and the first rotary frame 230, the backlash between the first cam groove 231 or the first cam follower 271, the inclination of the first cam groove 231 or the first cam follower 271, the coefficient of friction for the contact portion between the first cam groove 231 and the first cam follower 271, the surface roughness, the friction and lubrication conditions including the type of the lubricant.

In this embodiment, the thickness T in the radial direction of the first rotary frame 230 is set to the minimum thickness Tmin, and the depths D1 and D2 of the first and second cam grooves 231 and 232 are set to the minimum depths D1 min and D2min respectively. As can be clearly understood from the geometrical relationship shown in FIG. 6, the minimum thickness Tmin, the minimum value W1 min of the first region W1, and the minimum depth D2min satisfy the relationship expressed by the following formula (5).

[Formula 5]

$$T_{min} = W1_{min} + D2_{min} \tag{5}$$

By setting the minimum thickness Tmin, the minimum value W1 min of the first region W1, and the minimum depth D2min so that they satisfy the relationship expressed by the formula (5), the thickness T in the radial direction of the first rotary frame 230 can be minimized thus decreasing a size in the radial direction of the whole lens barrel 900.

As can be clearly understood from the geometrical relationship shown in FIG. 6, it is necessary to set the minimum thickness Tmin larger than the minimum depths D1 min and D2min. It is also necessary to set the depth D2min of the second cam groove 231 larger than the depth D1 min of the second cam groove 231 (formula (3)). Accordingly, it is necessary to establish the relationship expressed by the following formula (6) with respect to the minimum thickness Tmin and the minimum depths D1min and D2min explained hereinafter.

[Formula (6)]

$$T_{min} > D2_{min} > D1_{min} \tag{6}$$

It is necessary to set the minimum thickness Tmin of the first rotary frame 230 so that the minimum value W1min of the first region W1 and the minimum region W2min of the second region W2 can be ensured. As can be clearly understood from the geometrical relationship shown in FIG. 6, the relationship expressed by the following formula (7) is established with respect to the minimum depth D2min of the second cam groove 232.

[Formula (7)]

$$D2_{min} = W0_{min} + W2_{min} \tag{7}$$

The minimum depth D2min of the second cam groove 232 includes the minimum value W2min of the second region W2 (D2min=W0min+W2min). Accordingly, when the relationship expressed by the formula (5) is satisfied, the condition where the minimum thickness Tmin ensures the minimum value W1min of the first region W1 and the minimum value W2min of the second region W2 is satisfied. By substituting the formula (7) into the formula (5), the following formula (8) is obtained. In the formula (8), the minimum thickness Tmin is expressed by the minimum value W1 min of the first region W1 and the minimum value W2min of the second region W2.

[Formula (8)]

$$T_{min} = W1_{min} + W2_{min} + W0 \tag{8}$$

Then, burrs G (see FIG. 7) which may be formed on the first rotary frame 230 are explained.

Figure 12:
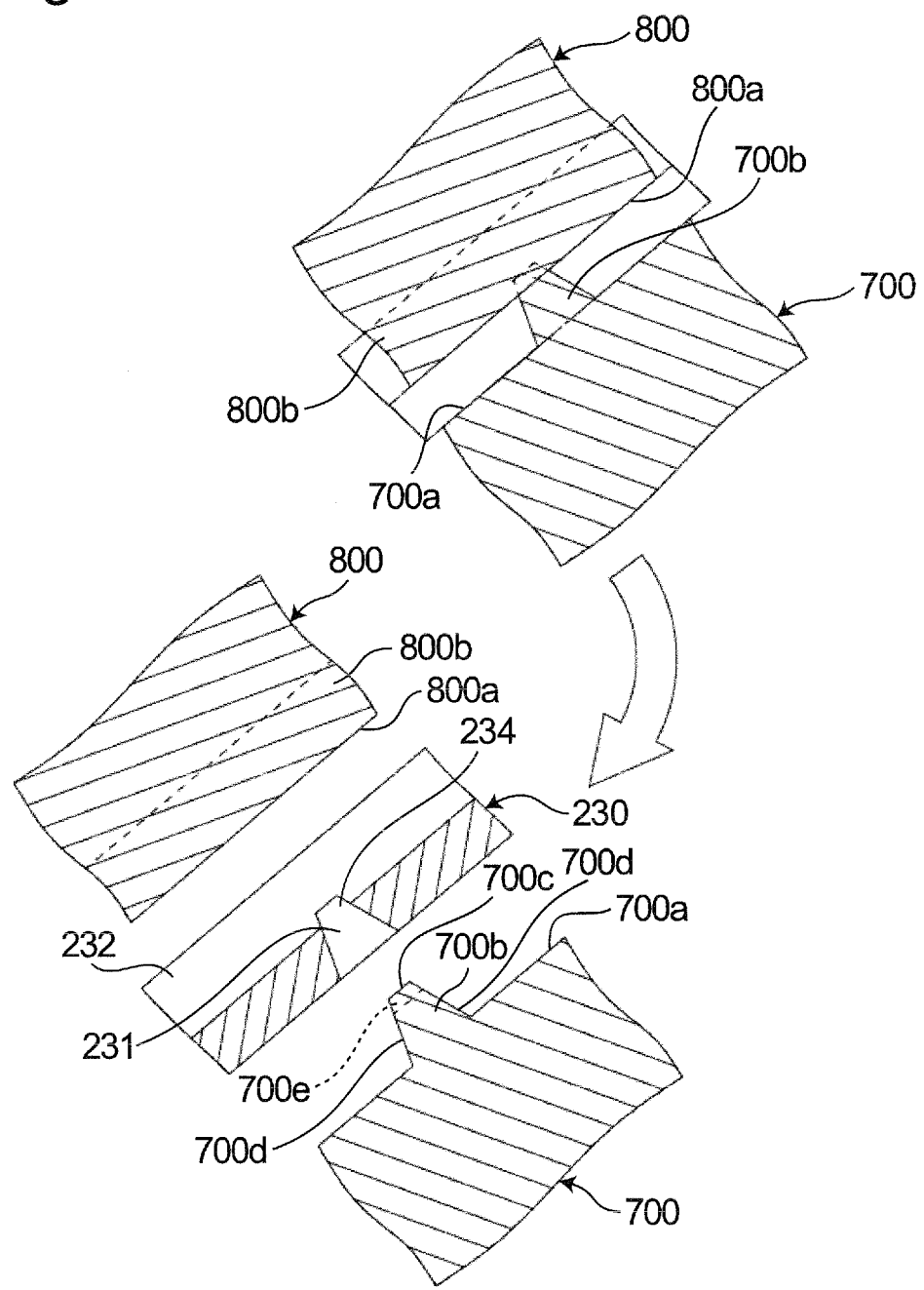
FIG. 12 is a schematic view for explaining a configuration of a cam cylinder frame formed by molds in the cross-section in the line A-A of FIG. 9.
Figure 13:
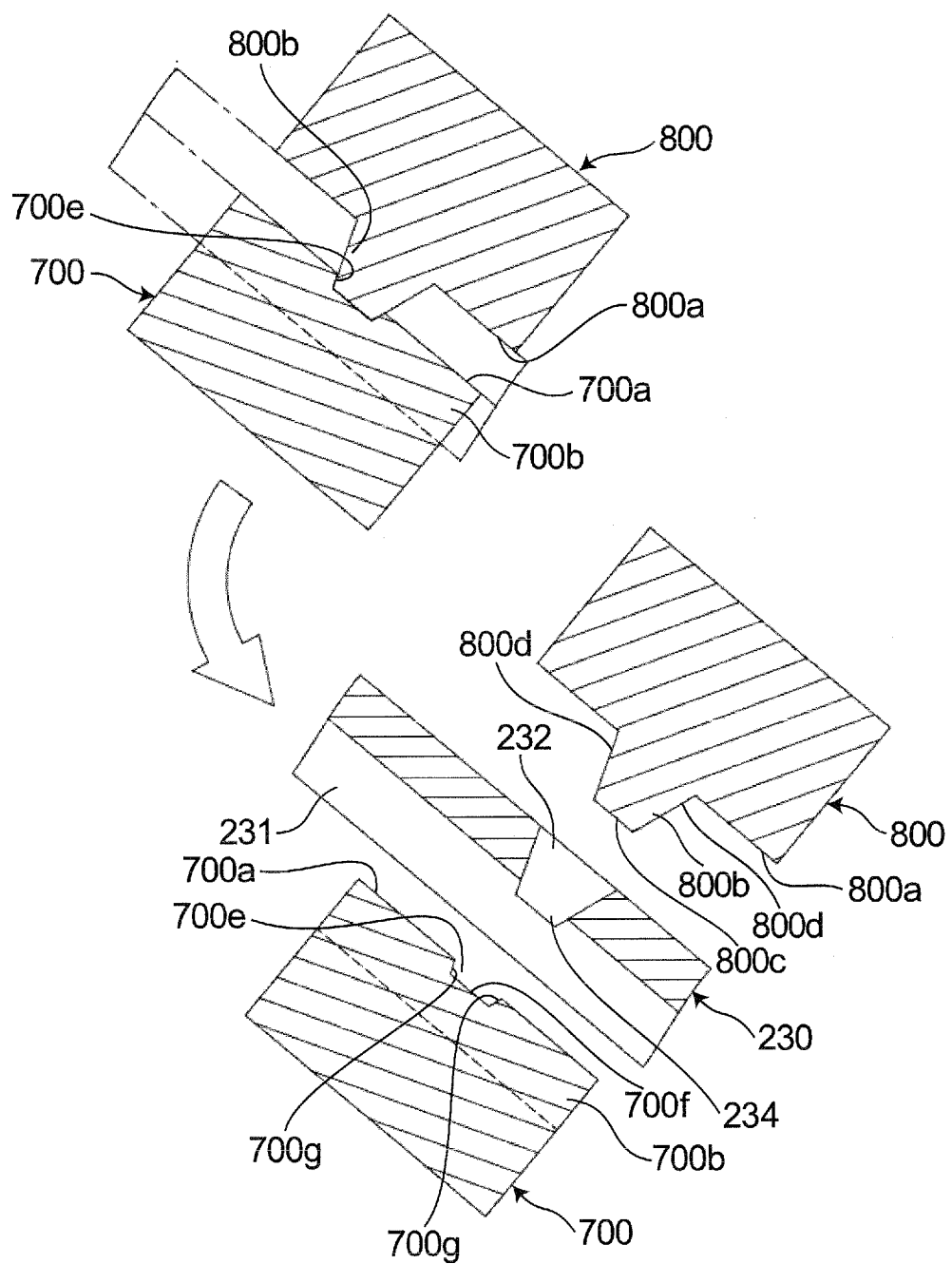
FIG. 13 is a schematic view for explaining a configuration of a cam cylinder frame formed by the molds in the cross-section in the line B-B of FIG. 9.
Figure 14:
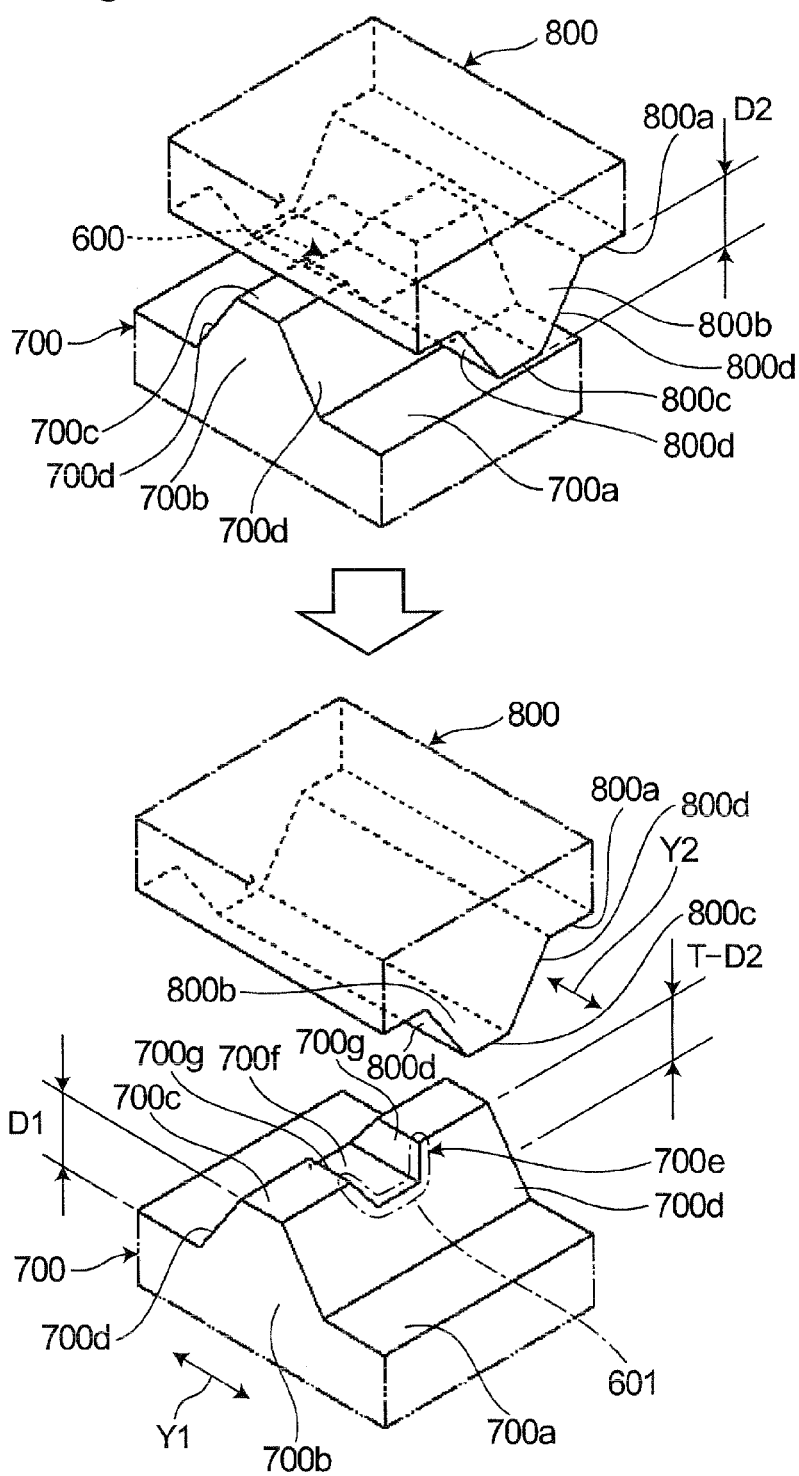
FIG. 14 is a schematic view of the molds.

The first rotary frame 230 is formed by injection molding using a resin material. FIGS. 12 to 14 schematically show an inner mold 700 and an outer mold 800 for forming the first rotary frame 230 by injection molding. The inner mold 700 is arranged inside the first rotary frame 230, and the outer mold 800 is arranged outside the first rotary frame 230.

The inner mold 700 includes a main surface 700a for forming the inner peripheral surface 230a of the first rotary frame 230. A projecting portion 700b for forming the first cam groove 231 is projected from the main surface 700a in a projecting manner. The projecting portion 700b includes a top surface 700c and a pair of inclined surfaces 700d. A height of the projecting portion 700b, that is, a distance in the radial direction between the main surface 700a and the top surface 700c is set to the depth D1 of the first cam groove 231.

The outer mold 800 includes a main surface 800a for forming the outer peripheral surface 230b of the first rotary frame. A projecting portion 800b for forming the second cam groove 232 is projected from the main surface 800a. The projecting portion 800b includes a top surface 800c and a pair of inclined surfaces 800d. A height of the projecting portion 800b, that is, a distance between the main surface 800a and the top surface 800c in the radial direction is set to the depth D2 of the second cam groove 232.

As described previously, the first rotary frame 230 is provided with the overlapping region W0 where both the first cam grooves 231 and the second cam grooves 232 are formed. Accordingly, at portions of the inner mold 700 and the outer mold 800 respectively corresponding to the intersecting portion 233 of the first cam groove 231 and the second cam groove 232 (see FIGS. 8 and 9), that is, at portions of the inner mold 700 and the outer mold 800 where the projecting portions 700b and 800b intersect with each other as viewed in the radial direction (see FIG. 14), it is necessary to allow one of the projecting portions 700b and 800b to pass through the other of the projecting portions 700b and 800b. In other words, it is necessary to bring the projecting portions 700b and 800b fitting engagement with each other at a position corresponding to the intersecting portion 233. One of the projecting portions 700b and 800b allows the other of them to pass through in this embodiment, but it is apparent that both of the projecting portions 700b and 800b allow passing through to each other.

As most clearly shown in FIG. 14, at the portion corresponding to the intersecting portion 233, a concave flank portion 700e is formed on the projecting portion 700b of the inner mold 700. The flank portion 700e includes a bottom surface 700f and a pair of inclined surfaces 700g which extends from the bottom surface to the top surface 700c of the projecting portion 700b. The inclined surfaces 700g is inclined with respect to the radial direction. The inclination of the inclined surfaces 700g is equal to the inclination of the inclined surfaces 800d of the projecting portion 800b of the outer mold 800. As described previously, while the height of the projecting portion 700b is set to the depth D2 of the second cam groove 232, the position of the bottom surface 700f of the flank portion 700e, that is, a distance between the top surface 700c of the projecting portion 700b and the bottom surface 700f of the flank portion 700e is set to the length of the overlapping region W0. In other words, the bottom surface 700f of the flank portion 700e corresponds to a boundary between the overlapping region W0 and the first region W1.

A portion of the projecting portion 800b of the outer mold 800 is fitted into the flank portion 700e formed on the projecting portion 700b of the inner mold 700 (a fitting portion conceptually indicated by reference numeral 600 in FIG. 14). Accordingly, the through hole 234 (see FIGS. 10 and 11) is formed in the first rotary frame 230 at the intersecting portion 233 of the first cam groove 231 and the second cam groove 232.

In the fitting portion 600 between the inner mold 700 and the outer mold 800, a mold matching surface is formed. That is, the bottom surface 700f of the flank portion 700e and the top surface 800c of the projecting portion 800b of the outer mold 800 are brought into close contact with each other, and the inclined surfaces 700g of the flank portion 700e and the inclined surfaces 800d of the projecting portions 800b of the outer mold 800 are brought into close contact with each other. From these parting lines (P.L.) and along the molding matching surface, there exists a possibility that a resin material is intruded into the intersecting portion 233 of the first cam groove 231 and the second cam groove 232, thereby forming burrs as exemplarily indicated by reference symbol G in FIG. 7. Particularly, a ridgeline indicated by reference numeral 601 in FIG. 14 forms the P.L. and there exists a possibility that the resin material intrudes into the intersecting portion 233 from the position of the ridgeline 601, i.e. from the ridgeline where the bottom surface 700f of the flank portion 700e and the inclined surfaces 700d of the projecting portion 700b intersect with each other and from the ridgeline where the inclined surface 700g and the inclined surface 700d intersect with each other. In other words, there exists possibility that the intrusion of the resin material occurs from the P.L. formed at the position of the ridgeline between the bottom surface 700f and the inclined surface 700d as well as from the P.L. formed at the position of the ridgeline between the inclined surface 700g and the inclined surface 700d. The bottom surface 700f of the flank portion 700e which constitutes one of the surfaces forming a merging point 601 corresponds to the boundary between the overlapping region W0 and the first region W1 as described previously. Accordingly, there exists a possibility that the burrs G are formed at the area extending from the boundary between the first region W1 and the overlapping region W0 into the overlapping region W0.

The intrusion of a resin material into the fitting portion 600 between the inner mold 700 and the outer mold 800 from the mold matching surface is easily to occur in the direction indicated by an arrow Y1 in FIG. 14. The intruding direction of the resin material indicated by the arrow Y1 corresponds to the direction which traverses the first cam groove 231 indicated by an arrow Y2 in FIGS. 7 and 10. Accordingly, there exists a possibility that burrs G are formed so as to project in the direction traverses the first cam groove 231 (arrow Y2) from the side wall 231b of the first cam groove 231. Further, the intruding direction (arrow Y1) of the resin material corresponds to the direction along which the second cam groove 232 extends in the direction indicated by an arrow Y3 in FIG. 10. Therefore, the burrs G do not project from the side wall 231b of the second cam groove 231 in the direction traverses the second cam groove 231. As the mold matching surface at the fitting portion 600 between the inner mold 700 and the outer mold 800, the bottom surface 700f of the flank portion 700e and the top surface 800c of the projecting portion 800b are tightly contacted with each other and the inclined surface 700g of the flank portion 700e and the inclined surface 800d of the projecting portion 800b of the outer mold 800 are contacted with each other. In this construction, because the outer mold 800 is not provided with any flank portion corresponding to the flak portion 700e of the inner mold 700, the projecting portion 800b of the outer mold 800 has the shape as same as that of the second cam groove 232. The mold matching surface is formed along the projecting portion 800b of the outer mold 800, i.e. along the shape of the second cam groove 232. Any mold matching surface traversing the projecting portion 800b of the outer mold 800, i.e. traversing the shape of the second cam groove 232, is not formed. This results in that the burrs G traversing the shape of the second cam groove 232 do not exist because the burrs G are formed along the mold matching surface.

As described above, the overlapping of the first cam groove 231 and the second cam groove 232 causes the possibility that burrs G are formed at the time of molding the first rotary frame 230. Further, as shown in FIG. 7, there exists a possibility that, in the intersecting portion 233 of the first cam groove 231 and the second cam groove 232, burrs G are formed so as to project in the direction which traverses the first cam groove 231 from the side walls 231b of the first cam groove 231, i.e. in the direction that the second cam groove 232 extends, at the boundary between the first region W1 and the overlapping region W0.

Next, the first cam follower 271 is explained.

With reference to FIG. 7, the first cam follower 271 includes, in order from an inner peripheral side of the first rotary frame 230, a projecting portion 275, a contact portion 276, a connection portion 277; and a clearance portion 278.

The connection portion 277 and the clearance portion 278 constitute a non-contact portion 279 which is not brought into contact with the side walls 231b of the first cam groove 231.

The projecting portion 275 has a proximal end thereof fixed to the shutter frame 270 and has a distal end thereof extended into the first cam groove 231. In this embodiment, the projecting portion 275 has a circular cylindrical shape or a circular columnar shape. A shape and a size of the projecting portion 275 are set so that the projecting portion 275 is away from and is not brought into contact with the side walls 231b of the first cam groove 231.

The contact portion 276 has a proximal end thereof connected to the projecting portion 275 and has a distal end thereof connected to the connection portion 277. In this embodiment, the contact portion 276 has a frustoconical shape where a diameter of the contact portion 276 is gradually decreased from a proximal end side to a distal end side. The contact portion 276 has a size and a shape so that the contact portion 276 is brought into contact with the side walls 231b of the first cam groove 231 in the first region W1. When the shutter frame 270 and the first rotary frame 230 move relative to each other, the contact portion 276 moves on the trajectory of the first cam groove 231 with maintaining contact with the side walls 231b of the first cam groove 231.

A size in the radial direction at which the contact portion 276 is brought into contact with the side walls 231b of the first cam groove 231 (a contact width C in the radial direction) of the contact portion 276 is set so as to avoid destruction including a dent and abrasion during sliding of a contact portion between the first cam groove 231 and the first cam follower 271. The contact width C in the radial direction depends on the various factors, and a numerical value of the contact width C varies depending on the combination of these factors. These factors include the impact force applied to the lens barrel 900 when falling down, the falling down direction of the lens barrel 900, the rigidities of the shutter frame 270, the necessary numbers of times of zooming and collapsing, the posture of the lens barrel 900 when activated, the total weight of the shutter frame 270, the abrasionability of materials for the shutter frame 270 and the first rotary frame 230, the backlash of the first cam groove 231 or the first cam follower 271, the inclination of the first cam groove 231 or the first cam follower 271, the coefficient of friction for a contact portion between the first cam groove 231 and the first cam follower 271, the surface roughness, the friction and lubrication conditions including the type of the lubricant.

The connection portion 277 has a proximal end thereof connected to the contact portion 276, and has a distal end thereof connected to the clearance portion 278. In this embodiment, the connection portion 277 has a frustoconical shape where a diameter of the connection portion 277 is gradually decreased from a proximal end side to a distal end side, and has a shape where the connection portion 277 is away from the side walls 231b of the first cam groove 231 in the first region W1.

The clearance portion 278 has a proximal end thereof connected to the connection portion 277, and constitutes a most distal end portion of the first cam follower 271. In this embodiment, the clearance portion 278 has a frustoconical shape where a diameter of the clearance portion 278 is gradually decreased from a proximal end side to a distal end side. A shape and a size of the clearance portion 278 are set so that the clearance portion 278 is away from and is not brought into contact with the side walls 231b of the first cam groove 231.

As shown in FIG. 7, in order to ensure an engaging margin for preventing the disengagement of the first cam follower 271 from the first cam groove 231 when the lens barrel 900 falls, the first cam follower 271 is constituted so as to traverse the boundary between the first region W1 and the overlapping region W0. On the other hand, as described previously, there exists the possibility that burrs G projecting in the direction that traverses the first cam groove 231 from the side walls 231b of the first cam groove 231 are formed at the area extending from the boundary between the first region W1 and the overlapping region W0 into the overlapping region W0. Assuming that the whole first cam follower 271 is brought into contact with the first cam groove 231, there is a possibility that the first cam follower 271 moving along the first cam groove 231 is brought into contact with the burrs G, and therefore the first cam follower 271 cannot draw the trajectory with higher accuracy. In view of the above, in this embodiment, a shape and a size of the first cam follower 271 are set so that the cam follower 271 is not brought into contact with the first cam groove 231 at the area extending from the boundary between the first region W1 and the overlapping region W0 into the overlapping region W0. That is, as described previously, on a distal end side of the first cam follower 271, the connection portion 277 which is away from the side walls 231b of the first cam groove 231 in the first region W1 and the clearance portion 278 which is not brought into contact with the side walls 231b of the first cam groove 231 are formed. By forming the first cam follower 271 in such a shape, it is possible to prevent or suppress the generation of an error in the moving trajectory and the position of the first cam follower 271 with respect to the first cam groove 231.

As shown in FIG. 7, the inclination R1 of the contact portion 276, the inclination R2 of the connection portion 277, and the inclination R3 of the clearance portion 278 are set so that they satisfy the relationship expressed by the following formula (9). These inclinations R1, R2, and R3 are set with reference to the radial direction (direction which is orthogonal to the optical axis AX).

[Formula 9]

$$R3 \leq R1 < R2 \text{ or } R1 < R3 < R2 \quad (9)$$

By setting the inclinations R1, R2, and R3 so that they satisfy the relationship expressed by the formula (9), portions of the first cam follower 271 on a more distal end side than the contact portion 276 is, that is, the connection portion 277 and the clearance portion 278 can be made away from the side walls 231b of the first cam groove 231. As the result, it is possible to prevent or suppress a phenomenon that the first cam follower 271 comes into contact with burrs G so that an error occurs in the moving trajectory and the position of the first cam follower 271 with respect to the first cam groove 231. Such enhancement of accuracy in the movement of the first cam follower 271 can suppress, not to mention an operation failure, the deterioration of accuracy in movement and accuracy in position and the generation of vibrations of the shutter frame 270 having the first cam follower 271 and the third lens group frame 260 mounted on the shutter frame 270. Accordingly, the enhancement of accuracy in the movement of the first cam follower 271 is effective for decreasing a zooming operation failure, for suppressing the lowering of an optical characteristic, and for decreasing a sway of an image at the time of video shooting.

With reference to FIG. 7, falling down of the lens barrel 900 may cause deformation of the first cam follower 271 toward an inner peripheral side so that the shutter frame 270 is likely to be disengaged from the first rotary frame 230, but the non-contact portion 279 comes into contact with an edge of the first cam groove 231 so as to prevent such disengagement of the shutter frame 270. The connection portion 277 preferably has the inclination by which the cam follower 271 is returned to the first cam groove 231 after the non-contact portion 279 is contacted with the edge of the first cam groove 231 and prevents the disengagement when falling down of the lens barrel 900. For example, it is preferable that the connection portion 277 continuously connects the contact portion 276 and the clearance portion 278 with each other at the inclination R2 of not more than 45 degrees. However, the inclination R2 is not limited to such an angle. The connection portion 277 is necessary to smoothly connect the contact portion 276 and the clearance portion 278 without interposing a stepping or angle portion between them. The inclination R2 is decided based on whether or not an original state, that is, a state where the first cam follower 271 is fitted in the first cam groove 231 at an original position can be restored due to a force in the radial direction generated due to the resiliency of the shutter frame 270 and the first rotary frame 230 when the shutter frame 270 is almost disengaged from the first rotary frame 230. The required inclination R2 varies depending on a total weight of the shutter frame 270, the rigidity of the shutter frame 270 and the first rotary frame 230, and a friction state of the contact portion between the first cam groove 231 and the first cam follower 271. The decision of the inclination R2 is necessary for preventing or suppressing the first cam follower 271 from getting over and being caught by the inner peripheral surface of the first rotary frame 230 when the shutter frame 270 is almost disengaged from the first rotary frame 230.

With reference to FIG. 7, it is preferable that the inclination R3 of the clearance portion 278 is set to not more than the inclination R1 of the contact portion 276. In this embodiment, the inclination of the first cam groove 231 is substantially equal to the inclination R1 of the contact portion 276. The inclination R3 of the clearance portion 278 is substantially equal to or smaller than the inclination of the first cam groove 231. This is because the disengagement of the first cam follower 271 from the first cam groove 231 can be prevented or suppressed. That is, when the shutter frame 270 is almost disengaged from the first rotary frame 230, immediately before the first cam follower 271 is disengaged from the first cam groove 231, a corner portion on a most distal end of the clearance portion 278 having the inclination R3 is brought into contact with the side wall 231b of the first cam groove 231. This contact generates a large resistance against the displacement of the first cam follower 271 in the direction along which the first cam follower 271 is disengaged from the first cam groove 231.

Next, the second cam follower 121 is explained.

With reference to FIG. 6, the second cam follower 121 includes, in order from an outer peripheral side of the first rotary frame 230, a projecting portion 125 and a contact portion 126.

The projecting portion 125 has a proximal end thereof fixed to the first lens group frame 120, and has a distal end thereof extended to the second cam groove 232. In this embodiment, the projecting portion 125 has a circular cylindrical shape or a circular columnar shape. A shape and a size of the projecting portion 125 are set so that the projecting portion 125 is away from and is not brought into contact with the side walls 232b of the second cam groove 232.

The contact portion 126 has a proximal end thereof connected to the projecting portion 125, and constitutes a most distal end portion of the second cam follower 121. In this embodiment, the contact portion 126 has a frustoconical shape where a diameter of the contact portion 126 is gradually decreased from a proximal end side to a distal end side. The contact portion 126 has a size and a shape so that the contact portion 126 is brought into contact with the side walls 232b of the second cam groove 232 in the second region W2 and the overlapping region W0.

As described previously, the burrs G (see FIG. 7) are formed in the direction along which the second cam groove 232 extends (indicated by the arrow Y3 in FIG. 10). A possibility that the burrs G project in the direction which traverses the second cam groove 232 is small. Accordingly, different from the contact portion 276 of the first cam follower 271, it is not so necessary for the contact of the contact portion 126 of the second cam follower 121 to take into account the avoiding of the contact between the contact portion 126 of the second cam follower 121 and burrs G and hence, the contact portion 126 can be formed extending on and over the second region W2 and the overlapping region W0 as described previously. As the result, it is possible to ensure a sufficient contact area between the second cam follower 121 and the side walls 232b of the second cam groove 232 and hence, the second cam follower 121 can draw the trajectory with higher accuracy. Further, destruction or disengagement of the contact portion when falling down, as well as abrasion during sliding of the contact portion, can be prevented.

As has been explained heretofore, according to this embodiment, it is possible to further decrease the thickness of the first rotary frame 230 having the first cam groove 231 on the inner periphery thereof and the second cam groove 232 on the outer periphery thereof while surely preventing or suppressing the disengagement of the first and second cam followers 271 and 121 from the first and second cam grooves 231 and 232 by a cause such as falling of the lens barrel 900 or the like (surely ensuring strength of the lens barrel against falling).

In this disclosure, the molds are configured on the premise that burrs may be generated at the area extending from the boundary between the first region W1 and the overlapping region W0 into the overlapping region W0. This is because there is a high possibility that a force generated on the first lens group frame 120 side when the lens barrel 900 falls becomes larger than a force generated on the shutter frame 270 when the lens barrel 900 falls. That is, a force applied to the first lens group frame 120 when the lens barrel 900 falls becomes larger than a force applied to the shutter frame 270 when the lens barrel 900 falls. Accordingly, while a possibility that the first lens group frame 120 is disengaged is high, a possibility that the shutter frame 270 is disengaged is low. In this disclosure, although the first cam follower 271 on a shutter frame 270 side is formed into a shape for allowing the first cam follower 271 on a shutter frame 270 side to avoid burrs of the first cam groove 231, a required amount of an engagement margin in the radial direction with respect to the first cam groove 231 of the first cam follower 271 is ensured and therefore the first cam follower 271 is not particularly easily to be disengaged compared to a case where the first cam follower 271 on a shutter frame 270 side is not formed into a shape for avoiding burrs. Accordingly, it is not always necessary to adopt the first cam groove 231 and the first cam follower 271 having a burr avoidable shape on a shutter frame 270 side where parts are hardly disengaged when the lens barrel 900 falls particularly as in the case of this disclosure. However, by adopting burr avoidable shape on the shutter frame 270 side as in the case of this disclosure, a strength of the lens barrel 900 against falling can be further enhanced. Further, the outer mold 800 may have a clearance portion and the second cam follower 121 may adopt the structure of the first cam follower 271 of this disclosure. Furthermore, both of the projecting portion 700b of the inner mold 700 and the projecting portion 800b of the outer mold 800 may have the construction which allows passing through to each other. In such construction, by forming the connection portion and the clearance portion also in the second corn follower 121, the thickness of the first rotary frame 230 can be thinner with ensuring the strength against falling The embodiment has been explained heretofore to exemplify the disclosure. However, this disclosure is not limited to the embodiment, and is also applicable to other embodiments which are acquired by suitably applying a change, replacement, addition or omission to the embodiment. New embodiments are also conceivable by combining the respective constitutional elements explained in the embodiment.

As set forth above, embodiments which the applicant considers as the best mode and other embodiments have been provided through the attached drawings and the detailed explanation of the disclosure. These embodiments are provided for exemplifying the invention called for in Claims to those who are skilled in the art so that they can reference the specific embodiments. Accordingly, the constitutional elements described in the attached drawings and the detailed explanation of the disclosure include not only constitutional elements which are indispensable for overcoming drawbacks but also constitutional elements other than the indispensable constitutional elements. In view of the above, even when the constitutional elements other than the indispensable constitutional elements are described in the attached drawings and the detailed explanation, it should not be readily construed that the constitutional elements other than the indispensable constitutional elements are indispensable. Further, various changes, modifications, replacements, additions, omissions and the like may be applied to the above-mentioned embodiments within the scope of Claims or the scope equivalent to the scope of Claims.

What is claimed is:

1. A lens barrel comprising:
    a cam cylinder frame having a first cam groove formed on an inner periphery thereof and a second cam groove formed on an outer periphery thereof so as to intersect with the first cam groove as viewed in a radial direction;
    a first movable frame arranged on an inner peripheral side of the cam cylinder frame and having a first cam follower which is engaged with the first cam groove; and
    a second movable frame arranged on an outer peripheral side of the cam cylinder frame and having a second cam follower which is engaged with the second cam groove,
    wherein a size in the radial direction of the cam cylinder frame is set smaller than a sum of a depth of the first cam groove and a depth of the second cam groove so that the cam cylinder frame includes a first region where only the first cam groove is formed, an overlapping region where the first cam groove and the second cam groove are formed, and a second region where only the second groove is formed, the regions being arranged in this sequence in a thickness direction from the inner peripheral side, and
    wherein a position of the first cam follower and a position of the second cam follower are different from each other in a circumferential direction.

2. The lens barrel according to claim 1, wherein at least one of the first cam follower and the second cam follower has a non-contact portion which is not brought into contact with a groove wall of the corresponding cam groove in the overlapping region.

3. The lens barrel according to claim 2, wherein the first cam follower includes the non-contact portion.

4. The lens barrel according to claim 3, wherein the second cam follower includes a contact portion which is brought into contact with the groove wall of the second cam groove in a boundary between the second region and the overlapping region.

5. The lens barrel according to claim 2, wherein the first cam follower includes in the following sequence in a radial direction from the first movable frame side:
    a projecting portion which projects toward the first cam groove;
    a contact portion which is brought into contact with the groove wall of the first cam groove in the first region; and
    the non-contact portion.

6. The lens barrel according to claim 5, wherein the non-contact portion includes in the following sequence in the radial direction from the first movable frame side:
    a connection portion which extends so as to be away from the groove wall of the first cam groove in a boundary between the first region and the overlapping region; and
    an clearance portion arranged at a position away from the groove wall of the first cam groove.

7. The lens barrel according to claim 6, wherein descending order of an inclination with respect to the radial direction is the connection portion, the contact portion, and the clearance portion.

8. The lens barrel according to claim 6, wherein the connection portion is inclined with reference to the radial direction.

9. The lens barrel according to claim 2, wherein descending order of a width of the region is the second region, the first region, and the overlapping region.

10. The lens barrel according to claim 2, wherein a phase of movement of the first cam follower in the first cam groove and a phase of movement of the second cam follower in the second cam groove are displaced from each other so that when one of the first and second cam followers is positioned at an intersecting portion where the first cam groove and the second cam groove intersect with each other as viewed in the radial direction the other of the first and second cam followers is positioned at a place other than the intersecting portion.

11. The lens barrel according to claim 10, wherein a through hole which penetrates from the inner periphery to the outer periphery of the cam cylinder frame is formed at the intersecting portion.

12. The lens barrel according to claim 2, wherein the first movable frame is a shutter frame, and the second movable frame is a lens group frame having a lens group positioned on a side closest to an object to be imaged.

* * * * *